United States Patent [19]

Metzler et al.

[11] Patent Number: 5,214,564
[45] Date of Patent: May 25, 1993

[54] CAPACITOR ASSEMBLY WITH INTEGRAL COOLING APPARATUS

[75] Inventors: Mark W. Metzler, Davis, Ill.; William E. Carlson, Spring Lake, Mich.

[73] Assignee: Sunstrand Corporation, Rockford, Ill.

[21] Appl. No.: 872,555

[22] Filed: Apr. 23, 1992

[51] Int. Cl.$^5$ ............................ F28D 15/02; F28F 7/00
[52] U.S. Cl. ....................................... 361/385; 165/185
[58] Field of Search ........................ 361/328–330, 361/381–386, 379, 388, 389, 407; 357/81; 165/185

[56] References Cited

U.S. PATENT DOCUMENTS

| | | | |
|---|---|---|---|
| 4,401,843 | 8/1983 | Harper et al. | 174/72 B |
| 4,451,694 | 5/1984 | Harper et al. | 174/72 B |
| 4,517,406 | 5/1985 | Erdle | 174/72 B |
| 4,599,486 | 7/1986 | Herrandez | 174/72 B |
| 4,777,561 | 10/1988 | Murphy et al. | 361/385 |
| 4,790,373 | 12/1988 | Raynor et al. | 165/185 |
| 4,914,551 | 4/1990 | Anschel et al. | 361/389 |
| 4,930,045 | 5/1990 | Carlson et al. | 361/329 |

FOREIGN PATENT DOCUMENTS

WO91/01041  1/1991  PCT Int'l Appl.

Primary Examiner—Donald A. Griffin
Attorney, Agent, or Firm—Marshall, O'Toole, Gerstein, Murray & Bicknell

[57] ABSTRACT

Prior capacitor assemblies used in high power applications have been difficult to mount on circuit boards and have generated large amounts of heat which leads to operational difficulties. In order to overcome these problems, a capacitor assembly includes first and second spaced thermally conductive members each having a channel therethrough for passage of a fluid coolant and a capacitor having first and second electrodes. Thermal paths are established between the capacitor and the fluid coolant in the channels of the first and second members so that heat developed by the capacitor is carried away during operation.

26 Claims, 3 Drawing Sheets

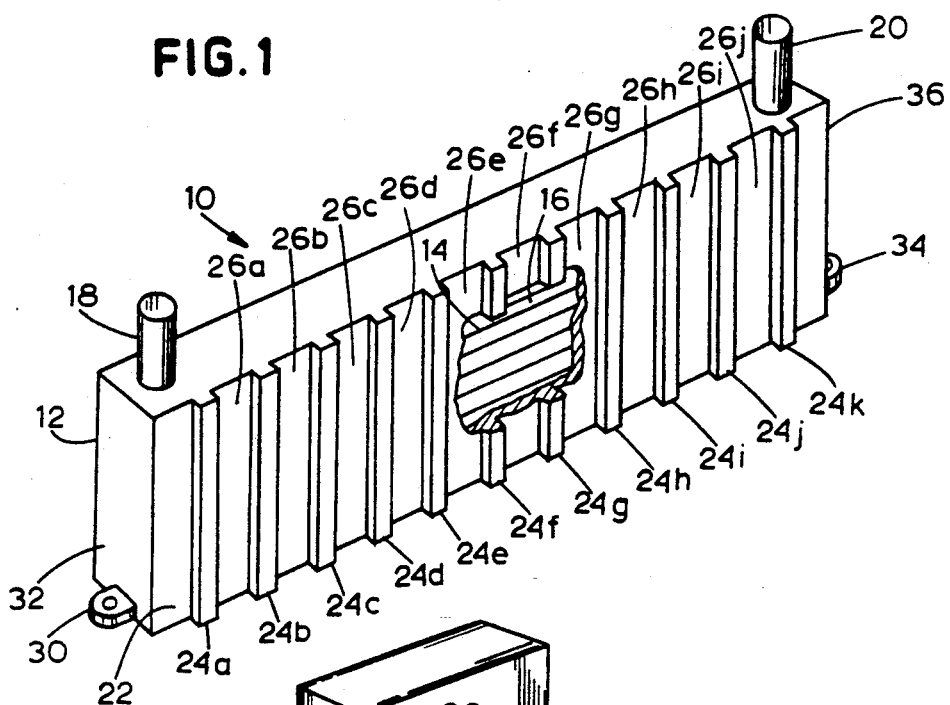
FIG.1
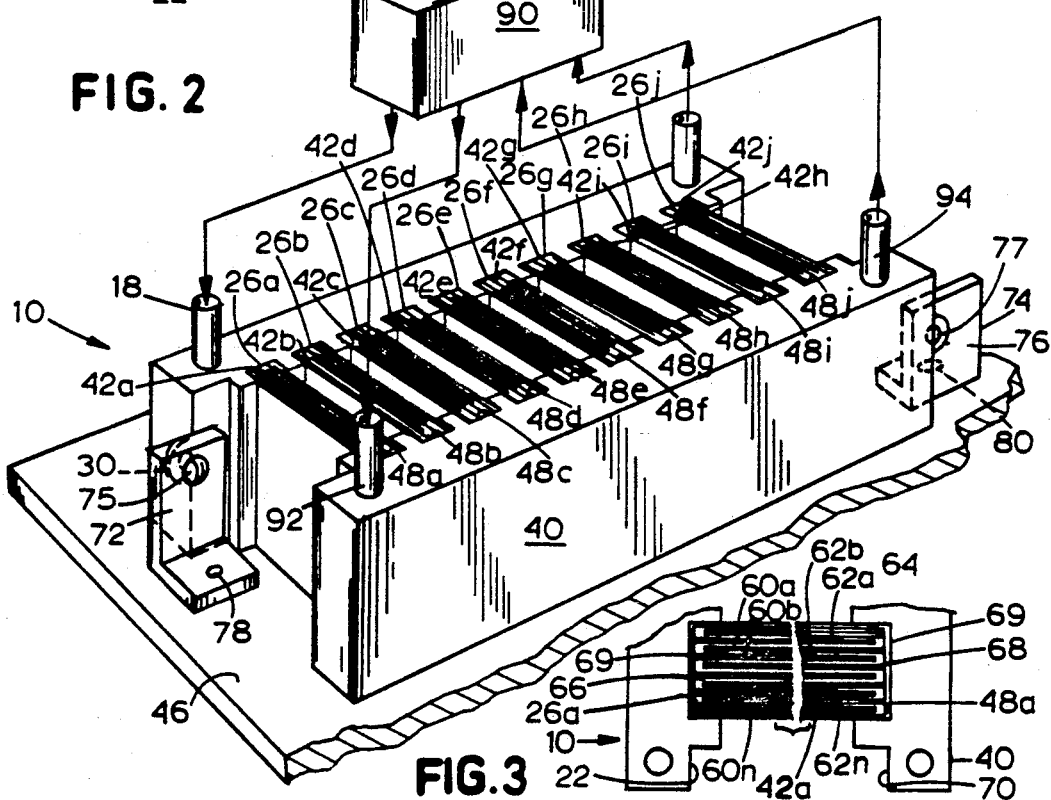
FIG.2
FIG.3

CAPACITOR ASSEMBLY WITH INTEGRAL COOLING APPARATUS

TECHNICAL FIELD

The present invention relates generally to capacitor assemblies, more particularly to a high power capacitor assembly for mounting a plurality of ceramic capacitors to the surface of a printed circuit board or other substrate.

BACKGROUND ART

Variable-speed, constant-frequency (VSCF) systems and other high power airborne applications require the use of high voltage capacitors in small packages to filter currents produced by the systems. Ceramic capacitors offer several advantages over other types when used in conjunction with high power electrical devices. In fact, large multilayered ceramic capacitor assemblies can be used to replace several smaller capacitors wired in parallel. These ceramic capacitors are rectangular in shape and have a width and height typically in excess of an inch and a depth of somewhat less than an inch. These capacitors include a plurality of ceramic layers separated by intervening conductive coatings. A portion of the coatings are connected together at one edge of the capacitor by a conductive electrode. The remaining layers of conductive coatings are connected together at a second edge of the capacitor by a conductive electrode.

Mounting of these large ceramic capacitors to a printed circuit board, chassis wall or other planar surface has proven to be a difficult task in the past. Because of their size, the capacitors must be mechanically fixed to the planar surface. Furthermore, due to the high quantity of power passing through the capacitors, significant electrical contact must be made to the capacitor electrodes.

Mounting was done typically in two steps. First, the body of the capacitor was usually mechanically fixed to the planar surface by cement or by pooling solder on the planar surface and pressing the dielectric body of the capacitor into the solder as it hardens. Second, electrical contact was accomplished by bringing electrical leads from the planar surface to the electrodes on the capacitor. Accordingly, mounting of large ceramic capacitors was accomplished by trial and error and had to be repeated individually for each capacitor to be mounted.

Apart from an unsightly mess on the printed circuit board and problems resulting from the pooled solder creating undesired electrical paths on the board, a problem encountered with the prior mounting methods was that significant thermal expansion of the capacitor would occur during operation. Accordingly, extreme stress would be imparted to the cement or solder holding the body of the capacitor to the planar surface. Occasionally, the cement or solder would loosen, allowing the capacitor to separate from the planar surface. At other times, the cement or solder would not allow the capacitor to expand, in turn resulting in catastrophic failure.

Finally, the prior mounting method failed to provide a means by which the capacitor could be cooled during operation, thereby relieving stress on the capacitors and lengthening their lives.

For years, low power applications have involved the mounting of capacitors to printed circuit boards. However, low power applications do not have to address the mechanical mounting, power handling or thermal expansion problems encountered in high power applications.

Harper et al., U.S. Pat. No. 4,401,843 discloses various structures for, and methods of, constructing miniaturized high capacitance bus bars. The bus bars incorporate discrete capacitive elements between a pair of bus bar conductors. Alternative arrangements are presented wherein the elements are maintained in electrical contact with the conductors while avoiding the development of short circuits between the two bus bar conductors.

Harper et al. U.S. Pat. No. 4,451,694 is directed to various structures for, and methods of constructing, miniaturized high capacitance bus bars. The bus bars incorporate discrete capacitive elements between a pair of bus bar conductors. In a preferred embodiment presented in this divisional of the Harper et al. '843 patent, a zebra film comprised of an elastomeric material having alternating strips of conducting and non-conducting material is positioned between the capacitive elements and the bus bar conductors. This zebra film establishes electrical contact between the capacitive elements while avoiding the development of short circuits between the two bus bar conductors. The zebra film may also have a mechanical force means applied whereby the applicable conductive surfaces are urged into electrical contact with the elastomeric strip material.

Erdle, U.S. Pat. No. 4,517,406 discloses one or more multilayer ceramic capacitors positioned in a laminated bus bar so that a pair of opposed, external electrodes on each capacitor are positioned in substantially coplanar engagement with the confronting plane surfaces of adjacent conductor strips in the bar. The two external electrodes of each capacitor are connected each to a different one of two spaced metal termination plates that are mounted on each capacitor. The two termination plates of each capacitor register with spaced recesses or openings formed in each the adjacent conductor strips to accommodate any projections on the termination plates and thereby permit coplanar engagement of the external electrodes with the conductor strips.

Herrandez, U.S. Pat. No. 4,599,486 discloses a miniaturized surface mountable bus bar wherein a sheet of insulating material is laminated between a pair of bus conductors and windows are provided in the laminated structure. A plurality of multilayer ceramic capacitor elements are inserted in the windows and alternate conductive side plates of the capacitors are electrically connected to the two bus conductors. The capacitors are comprised of alternating layers of conductive material and dielectric material having opposed terminating side conductors which are oriented parallel to the sheet of insulating material and the pair of bus conductors after assembly thereof.

SUMMARY OF THE INVENTION

According to the present invention, a capacitor assembly permits capacitors to be mounted on a substrate in a simple and inexpensive fashion without the problems heretofore encountered in the prior art.

More particularly, a capacitor assembly includes first and second spaced thermally conductive members, each having a channel for passage of a fluid coolant and a capacitor having first and second electrodes. First and second means are provided for establishing thermal paths between the capacitor and the fluid in the channels of the first and second members, respectively, wherein the first and second establishing means are electrically conductive and in electrical contact with the first and second electrodes of the capacitor, respectively.

In accordance with one form of the invention, the channels are enclosed and conduct a cooling liquid while in a second form of the invention the channels are disposed on the outside of the first and second members in contact with a cooling gas.

In accordance with one embodiment of the present invention, the first and second establishing means are integral with the first and second members, respectively. In accordance with a further embodiment of the present invention, the first and second establishing means are electrically insulated from the first and second members by first and second sheets of dielectric material.

Preferably, each of the first and second establishing means includes a slot within which a portion of the capacitor is disposed. In addition, the capacitor assembly may include a plurality of additional capacitors and each of the first and second establishing means may include a number of slots within each of which a portion of one of the capacitors is disposed.

In accordance with a further aspect of the present invention, a capacitor assembly includes a pair of substantially parallel, spaced-apart, thermally conductive bus bars having a plurality of corresponding spaced-apart parallel slots on facing planar sides thereof wherein each bus bar also includes an interior channel therethrough. A plurality of capacitors are provided each having opposing electrode ends, the capacitors being disposed between the pair of bus bars whereby the electrode ends are positioned within corresponding slots. Means are supplied for providing cooling fluid to the channels of the bus bars for cooling the capacitors.

Preferably, each bus bar includes a main member through which the channel extends and a capacitor mounting member in which the slots are formed. In accordance with one embodiment of the present invention, the main member is electrically and mechanically secured to the capacitor mounting member. In accordance with a further embodiment of the present invention, the main member is mechanically secured to the capacitor mounting member but is electrically isolated therefrom by an insulating sheet.

Preferably, the bus bars are coupled to a printed circuit board or other substrate.

In accordance with one aspect of the present invention, the slots are substantially the same width to accommodate capacitors of substantially the same thicknesses. Further in accordance with a further aspect of the present invention, the slots are of differing widths to accommodate capacitors of different thicknesses. In accordance with the preferred embodiment, the electrode ends of the capacitors are soldered within the slots.

In accordance with a still further aspect of the present invention, a capacitor assembly for securing capacitors to a printed circuit board includes a pair of substantially parallel, spaced-apart bus bars having a plurality of corresponding spaced-apart slots on facing sides thereof and each having a channel therethrough wherein heat exchanger fins are disposed in each channel. A plurality of ceramic capacitors are provided having opposing electrode ends wherein the capacitors are disposed between the bus bars and the electrode ends are positioned within the corresponding slots. The capacitor ends are fixed within the slots by solder or other means and means are provided for supplying cooling fluid to the channels of the bus bars so that heat is removed from the capacitors through portions of the bus bars.

The assembly of the present invention efficiently cools high power capacitors so that thermal expansion problems are avoided. The present invention is compact and simple to assemble, thereby avoiding the problems noted with respect to the prior art.

BRIEF DESCRIPTION OF THE DRAWINGS

FIG. 1 comprises an isometric view of a bus bar utilized in the present invention with portions broken away to reveal internal structures thereof;

FIG. 2 comprises an isometric view of a capacitor assembly according to a first embodiment of the present invention;

FIG. 3 comprises a fragmentary elevational view of a portion of the capacitor assembly of FIG. 2;

DESCRIPTION OF THE PREFERRED EMBODIMENTS

Figure 4:
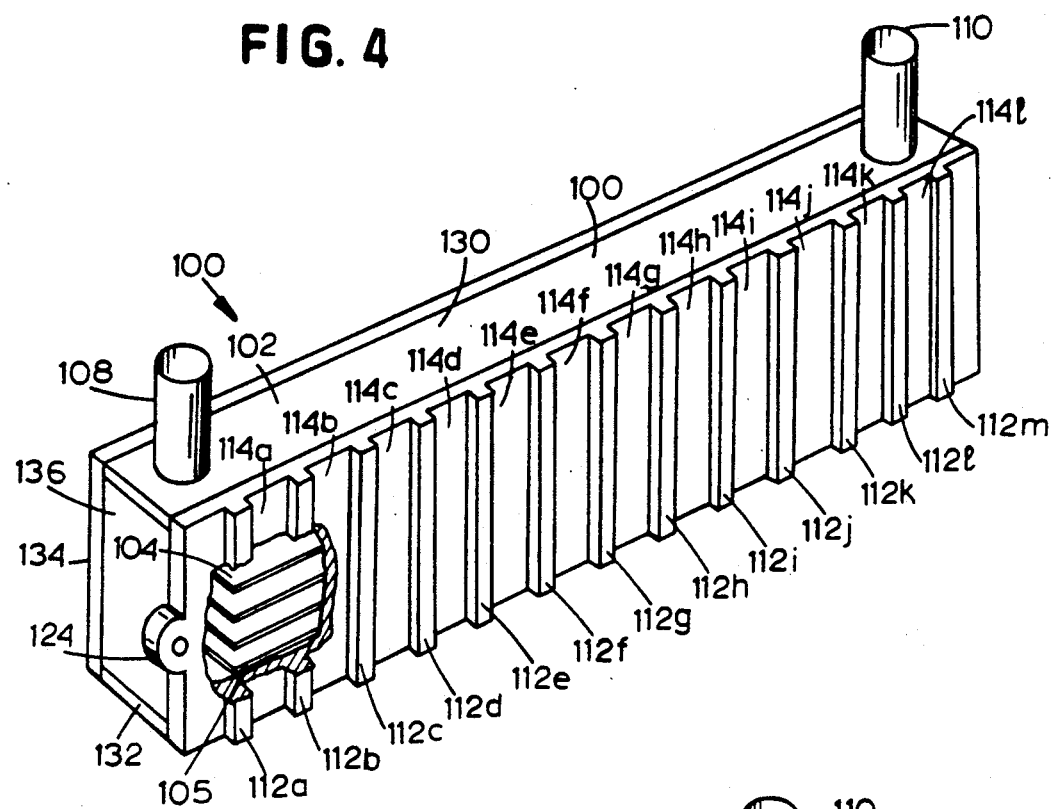
FIGS. 4 and 5 are isometric views of bus bars used in alternative embodiments of the present invention with portions broken away to reveal internal structures thereof.

Referring now to Figure a bus bar 10 is fabricated of aluminum or another thermally conductive material and is preferably, although not necessarily, rectangular in cross section. The bus bar 10 includes a main member 12 that includes a channel 14. In the form of the invention shown in FIGS. 1–5, the channel 14 extends through the main member 12 and is enclosed. As described in greater detail hereinafter in connection with FIGS. 6 and 7, one or more channels may be disposed on the outside of the main member in contact with a cooling gas, if desired. Preferably, although not necessarily, a plurality of heat exchanger fins 16 are disposed within the channel 14. The heat exchanger fins 16 are optional in the sense that the need therefor depends upon several factors including the type of cooling fluid used, the flow rate of the coolant and the amount of heat to be dissipated. The fins 16 end at positions just short of the ends of the bus bar so that cooling fluid may be distributed to or collected from the fins 16 during operation. The channel 14 is coupled by inlet and outlet conduits 18, 20, respectively, to a source of cooling fluid, such as a cooling liquid, as described in greater detail hereinafter.

The bus bar 10 further includes a capacitor mounting member 22. In the preferred embodiment illustrated in FIGS. 1 and 2, the main member 12 and the capacitor mounting member 22 are formed as an integral unit. The capacitor mounting member 22 includes a series of flanges 24a–24k defining parallel slots 26a–26j therebetween. It should be noted that the number of flanges 24 and slots 26 may be varied to accommodate a different number of capacitors according to the requirements of a particular application.

The spacing between adjacent flanges, for example, between the flanges 24a and 24b, may be the same as or different than the spacing between other flanges, for example the flanges 24b and 24c, so that the slots 26a, 26b are of the same width or are of different widths. As noted in greater detail hereinbelow, capacitors of the same or different widths may thus be accommodated within the slots 26a-26j.

The bus bar 10 preferably includes an electrical and mechanical mounting tab 30 which is disposed at a first end 32 of the bus bar 10. If necessary or desirable, a second mounting tab 34 may be disposed on a second end 36 of the bus bar 10, although this tab is purely optional. The tabs 30, 34 permit the bus bar 10 to be mechanically and electrically connected to a circuit board or other substrate. It should be noted that the position of one or both tabs 30, 34 may be changed, for example to the positions shown in FIG. 2, 4 and 5, if desired, particularly if the bus bar 10 is not to be secured to a circuit board. In this case, brackets (described hereinafter) may be used.

Referring now to FIG. 2, the bus bar 10 and an identical bus bar 40 are used together with ceramic multilayer capacitors 42a-42j to form a capacitor assembly 44 which is mounted on a substrate, such as a generally planar circuit board 46. The bus bars 10 and 40 are arranged such that the slots 26a-26j face and are aligned with parallel corresponding slots 48a-48j of the bus bar 40. Preferably, the bus bars 10 and 40 are disposed in parallel relationship with one another and the widths of corresponding slots are the same. That is, the width of the slot 26a is the same as the slot 48a, the width of the slot 26b is the same as the width of the slot 48b, and so on. The widths of the slots 26a-26j and 48a-48j are substantially equal to the thicknesses of the capacitors 42a-42j, respectfully.

The capacitors 42a-42j are identical, except possibly due to differences in size, and hence only the capacitor 42a will be described in detail. Referring to FIG. 3, the capacitor 42a includes a first set of conductive coatings 60a, 60b ... 60n and a second set of conductive coatings 62a, 62b ... 62n which are interleaved and arranged in parallel layers with ceramic dielectric material 64 disposed between the layers. The first set of conductive coatings are connected together at an electrode end formed by a conductive coating 66 while the second set of electrically conductive coatings are connected together at an electrode end formed by a conductive coating 68. Solder 69 or other means may be used to establish electrical contact between the conductive coatings 66, 68 and the capacitor mounting member 22 of the bus bar 10 and a corresponding capacitor mounting member 70 of the bus bar 40, respectively.

Referring again to FIG. 2, the bus bars 10, 40 are electrically and mechanically connected to the circuit board 46 or another substrate by brackets 72, 74 which are secured to the tab 30 and a corresponding tab 76 of the bus bar 40 by a bolt or other fasteners 75, 77. The brackets 72, 74 are joined to the circuit board 46 in any suitable fashion such as by fasteners 78, 80 or by solder. Alternatively, when the tabs 30, 76 are disposed in the positions shown in FIG. 1, the brackets 72, 74 are not needed and the tabs 30, 76 are directly electrically and mechanically secured to the circuit board 46 in any suitable fashion.

During operation, the temperature of the capacitors 42a-42j reaches high levels. In order to prevent the problems encountered by the prior art due to thermal expansion and contraction, cooling fluid is provided to the channel 16 and a corresponding channel (not shown) in the bus bar 40 by a fluid pump 90. The fluid pump may provide cooling oil or another fluid into the inlet 18 and a corresponding inlet 92 of the bus bar 40 and may receive exhaust fluid from the outlet 20 and a corresponding outlet 94 of the bus bar 40.

It can be seen that the capacitor assembly of FIG. 2 includes first and second bus bars, each of which serves as an electrical contact bus for a plurality of parallel connected capacitors 42a-42j and which carry away heat generated by the capacitors during operation. Electrical contact to the commonly connected first electrodes of capacitors 42a-42j may be effected by way of the bus bar 10 and the bracket 72 whereas connection to the second commonly connected electrodes of the capacitors 42a-42j may be effected by way of the bus bar 40 and the bracket 74.

Figure 5:
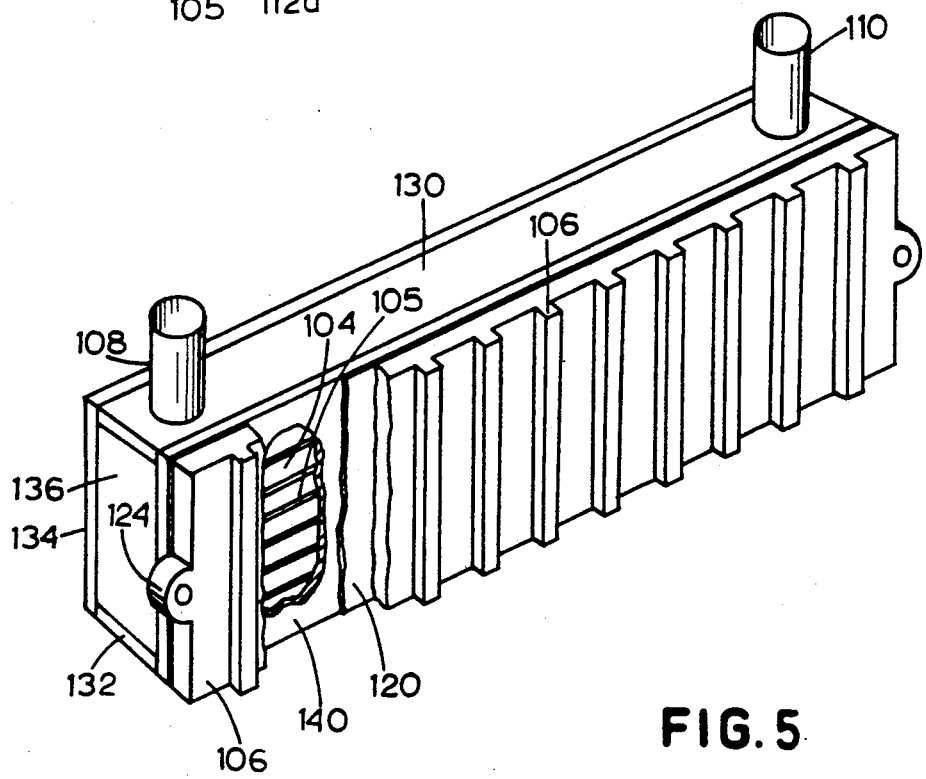

FIGS. 4 and 5 illustrate bus bars which may be used in place of the bus bars 10 and 40 of FIG. 2. Referring first to FIG. 4, a bus bar 100 includes a main member 102 through which a channel 104 extends, similar to the channel 14 of FIG. 1. A plurality of heat exchanger fins 105 are disposed in the channel 104. As before, and as seen in FIG. 4, the fins 105 terminate at points spaced from the ends of the bus bar 100 so that space is provided to distribute coolant to and collect coolant from the spaces between the fins 105.

A capacitor mounting member 106 is secured to the main member 100 by any suitable means. It can be seen that the difference between the bus bar 10 of FIG. 1 and the bus bar 100 of FIG. 4 lies in the fact that the bus bar 10 is an integral unit whereas the bus bar 100 includes a main member 102 separate from the capacitor mounting member 106.

The bus bar 100 further includes an inlet 108 and an outlet 110 which permit cooling fluid to be passed through the channel 104. The capacitor mounting member 106 includes flanges 112a-112m which define slots 114a-114l. Again, the number of flanges 112 and slots 114 may be varied as needed for a particular application.

The bus bar 100 of FIG. 4 may be used together with a substantially identical bus bar in the arrangement of FIG. 2 to create a capacitor assembly according to the present invention.

FIG. 5 illustrates a further alternative bus bar which may be used in the capacitor assembly of FIG. 2. Elements common to FIGS. 4 and 5 are assigned like reference numerals. In the embodiment of FIG. 5, the main member 100 is separated from the capacitor mounting member 106 by an electrical insulator in the form of an electrically insulative dielectric sheet 120 which may be fabricated, for example, of a material known as KAPTON, such term being a trademark of E.I. dupont de Nemours and Company for flexible film for electrical insulation. In this embodiment the main member 100, dielectric sheet 120 and capacitor mounting member 106 are secured together by layers of adhesive disposed therebetween. If desired, the dielectric sheet 120 may be omitted, if the adhesive is a dielectric material and a sufficient thickness of adhesive can be placed between the main member 100 and the capacitor mounting member 106 to obtain adequate dielectric strength.

As noted in connection with the previous embodiment of FIG. 1 and 2, electrical connection to commonly connected electrodes of the capacitors may be effected by way of a tab 124 which is formed integrally with the capacitor mounting member 106. In the embodiments of FIGS. 4 and 5, the main member 100 may be formed as an integral piece by casting or by another manufacturing process or may be fabricated by plates, in which case the main member includes upper and lower plates 130, 132, respectively, a back plate 134, a first side plate 136 and a second side plate (not visible in the Figures). The plates are joined in any suitable fashion and are further joined to the capacitor mounting member 106. In the case of the bus bar 100 of FIG. 5, a cover plate 140 completes the enclosure surrounding the channel 104.

The embodiment illustrated in FIG. 5 is particularly suited for use in military applications where there is a requirement that cooling fluid be electrically isolated from electrical components.

Figure 6:
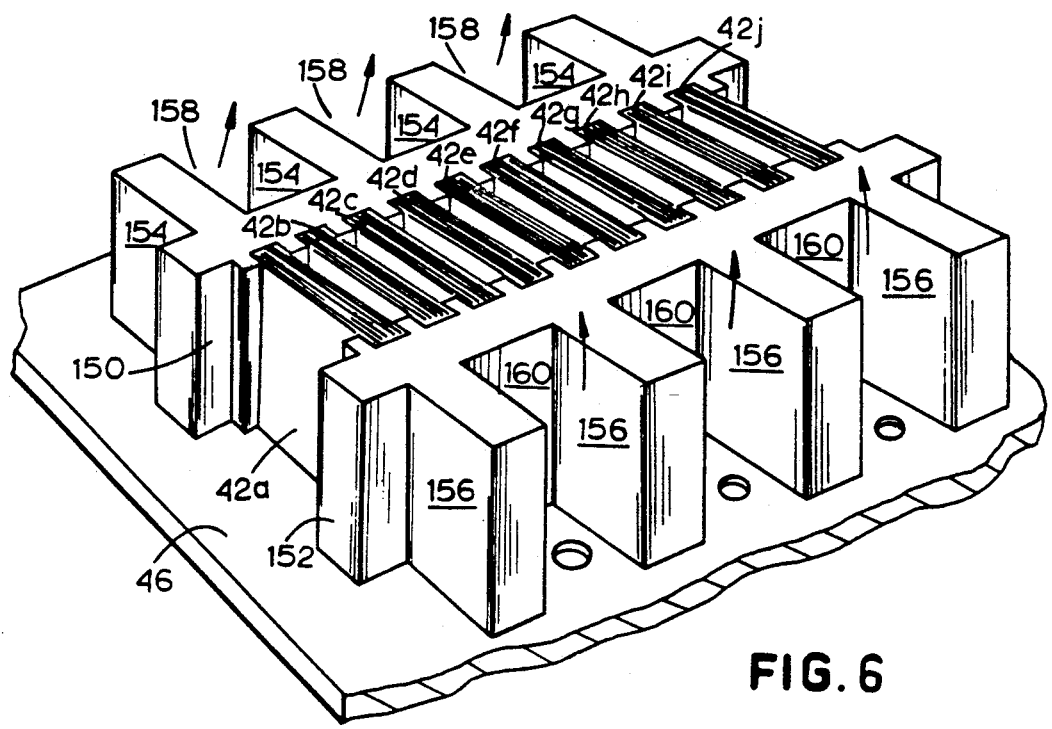
FIGS. 6 and 7 are views similar to FIG. 2 illustrating still further embodiments of the present invention.

FIG. 6 illustrates a further embodiment of the present invention wherein each of first and second bus bars 150, 152 fabricated of aluminum or another suitable material includes cooling fins 154, 156, respectively, forming one or more exterior channels 158, 160, respectively. In this embodiment, one or more holes may be provided in the circuit board 46 for passage of cooling air. If necessary or desirable, a fan (not shown) may be used to circulate the cooling air or air may be circulated by simple convection. As before, the capacitors 42 are disposed in slots in the bus bars 150, 152.

Figure 7:
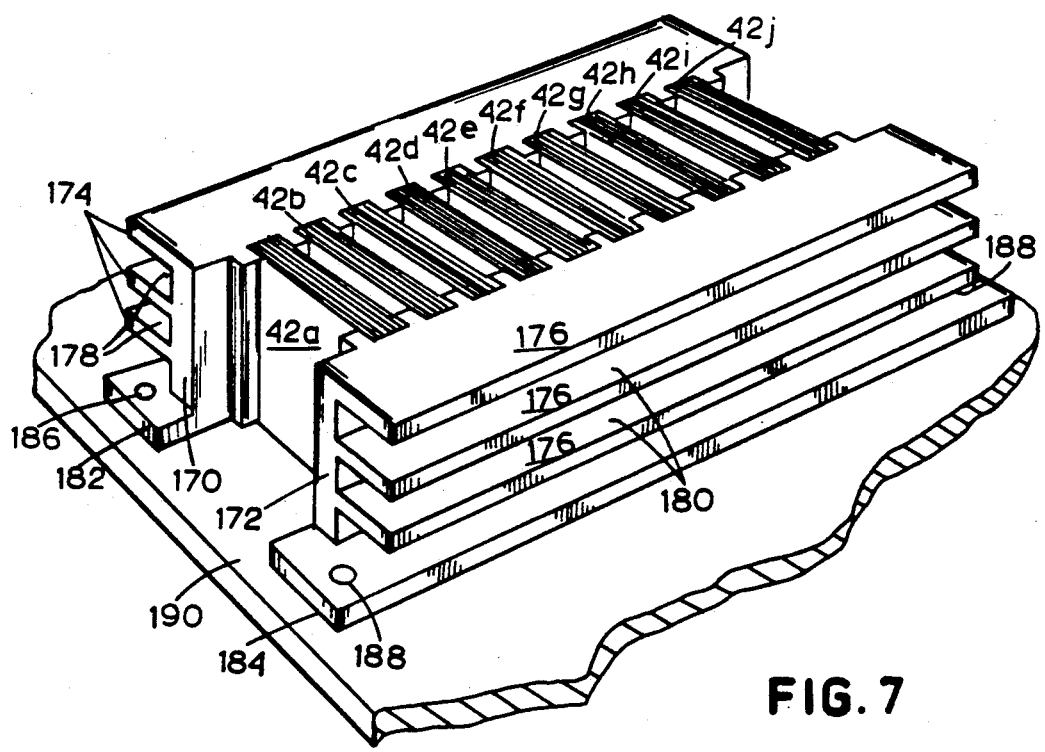

FIG. 7 illustrates yet another alternative embodiment similar to that of FIG. 6 in the sense that air is used as the cooling medium. In this embodiment, first and second bus bars 170, 172 fabricated of aluminum or another suitable material include cooling fins 174, 176, respectively forming channels 178, 180, respectively. The fins 174, 176 extend horizontally and thus form horizontal channels 178, 180, as compared with the vertical channels 158, 160 formed by the fins 154, 156 of the embodiment of FIG. 6. The bus bars 170, 172 include base plates or flanges 182, 184, respectively, having mounting holes 186, 188 disposed therein (only one of the holes 186 is visible in FIG. 7). Screws or other fasteners may extend through the holes 186, 188 into a circuit board 190 or other substrate. The bus bars are thus mechanically secured to the circuit board 190 and, if desired, electrical paths may be established through the bus bars 170, 172 via the base plates 182 to electrical buses or electrical components on the circuit board 190. As with the embodiment of FIG. 6, air flow may be effected by way of convection or a fan may be utilized to force air through the channels 178, 180.

The invention as described herein provides a means for securing large, high power, high temperature ceramic capacitors to a printed circuit board or other substrate. The invention allows dissipation of heat generated by capacitors during operation and provides a means for mounting multiple ceramic capacitors in electrical parallel to handle high power in a small package suitable for airborne applications.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A capacitor assembly, comprising:
    first and second spaced thermally conductive members each having a channel for passage of a fluid coolant;
    a capacitor having first and second electrodes; and
    first and second means for establishing thermal paths between the capacitor and the fluid coolant in the channels of the first and second members, respectively, the first and second establishing means being electrically conductive and in electrical contact with the first and second electrodes of the capacitor, respectively.

2. The capacitor assembly of claim 1, wherein the channels are enclosed and conduct a cooling liquid.

3. The capacitor assembly of claim 1, wherein the channels are disposed on the outside of the first and second members in contact with a cooling gas.

4. The capacitor assembly of claim 1, wherein the first and second establishing means are integral with the first and second members, respectively.

5. The capacitor assembly of claim 1, wherein the first and second establishing means are electrically insulated from the first and second members by first and second sheets of dielectric insulation.

6. The capacitor assembly of claim 1, wherein each of the first and second establishing means includes a slot within which a portion of the capacitor is disposed.

7. The capacitor assembly of claim 1, further including a plurality of additional capacitors and wherein each of the first and second establishing means includes a number of slots within each of which a portion of one of the capacitors is disposed.

8. A capacitor assembly comprising:
    a pair of substantially parallel, spaced-apart, thermally conductive bus bars having a plurality of corresponding spaced-apart parallel slots on facing sides thereof, each bus bar also having an interior channel therethrough;
    a plurality of capacitors each having opposing electrode ends, the capacitors being disposed between the pair of bus bars whereby the electrode ends of each capacitor are positioned within corresponding slots; and
    means for providing cooling fluid to the channels of the bus bars for cooling the capacitors.

9. The capacitor assembly of claim 8, wherein each bus bar includes a main member through which the channel extends and a capacitor mounting member in which the slots are formed.

10. The capacitor assembly of claim 9, wherein the main member of each bus bar is electrically and mechanically secured to the capacitor mounting member of the bus bar.

11. The capacitor assembly of claim 9, wherein the main member of each bus bar is mechanically secured to the capacitor mounting member of the bus bar but is electrically isolated therefrom by an insulating sheet.

12. The capacitor assembly of claim 8, wherein the bus bars are coupled to a printed circuit board.

13. The capacitor assembly of claim 8, wherein the slots are of substantially the same width to accommodate capacitors of substantially the same thickness.

14. The capacitor assembly of claim 8, wherein the slots are of differing widths to accommodate capacitors of differing thicknesses.

15. The capacitors assembly of claim 8, wherein the electrode ends of the capacitors are soldered within the slots.

16. A capacitor assembly for securing capacitors to a printed circuit board, comprising;
    a pair of substantially parallel, spaced-apart bus bars having a plurality of corresponding spaced-apart slots on facing sides thereof and each having a channel therethrough wherein heat exchange fins are disposed in each channel;

a plurality of ceramic capacitors having opposing electrode ends wherein the capacitors are disposed between the bus bars and the electrode ends are positioned within the corresponding slots;

solder fixing the capacitor ends within the slots; and means for supplying cooling fluid to the channels of the bus bars so that heat is removed from the capacitors through portions of the bus bars.

17. The capacitor assembly of claim 16, wherein each bus bar includes a main member through which the channel extends and a capacitor mounting member in which the slots are formed.

18. The capacitor assembly of claim 17, wherein each main member is electrically and mechanically secured to the capacitor mounting member of the bus bar.

19. The capacitor assembly of claim 17, wherein the main member is mechanically secured to the capacitor mounting member of the bus bar but is electrically isolated therefrom by an insulating sheet.

20. The capacitor assembly of claim 16, wherein bus bars are coupled to a printed circuit board.

21. The capacitor assembly of claim 16, wherein the slots are of substantially the same width to accommodate capacitors of substantially the same thickness.

22. The capacitor assembly of claim 16, wherein the slots are of differing widths to accommodate capacitors of differing thicknesses.

23. A bus bar comprising:
a main member having a channel therethrough and adapted to receive cooling fluid therein; and
a thermally conductive capacitor mounting member adjacent the main member including a pair of flanges defining a slot therebetween wherein a ceramic capacitor may be received in such slot and capable of conducting heat away from the capacitor when the capacitor is received in such slot and when cooling fluid is flowing in the channel.

24. The bus bar of claim 23, wherein the capacitor mounting member includes a plurality of flanges defining a series of slots therein each for receiving a ceramic capacitor.

25. The bus bar of claim 23, wherein the capacitor mounting member includes a tab which permits the mounting member to be electrically and mechanically connected to a substrate.

26. The bus bar of claim 25, wherein heat exchanger fins are disposed in the channel within the main member.

* * * * *